US008083392B2

(12) United States Patent
Chien

(10) Patent No.: US 8,083,392 B2
(45) Date of Patent: Dec. 27, 2011

(54) LED LIGHT HAS REMOVABLE SELF-POWER LED UNIT(S)

(76) Inventor: Tseng-Lu Chien, Walnut, CA (US)

(*) Notice: Subject to any disclaimer, the term of this patent is extended or adjusted under 35 U.S.C. 154(b) by 0 days.

(21) Appl. No.: 12/887,700

(22) Filed: Sep. 22, 2010

(65) Prior Publication Data

US 2011/0013385 A1 Jan. 20, 2011

(51) Int. Cl.
*H01R 33/00* (2006.01)
(52) U.S. Cl. .... 362/641; 362/800; 362/640; 362/249.02
(58) Field of Classification Search .......... 362/640–646, 362/249.02, 800, 249.11
See application file for complete search history.

(56) References Cited

U.S. PATENT DOCUMENTS

| 5,926,440 | A  | * | 7/1999  | Chien | 368/10 |
| 6,964,498 | B2 | * | 11/2005 | Wu    | 362/242 |
| 7,186,016 | B2 | * | 3/2007  | Jao   | 362/644 |

\* cited by examiner

*Primary Examiner* — Anabel Ton
(74) *Attorney, Agent, or Firm* — Bacon & Thomas, PLLC

(57) ABSTRACT

An LED light device has removable self-powered LED units that can operate independently when removed from the light device and as part of the LED light device when assembled to the light device.

8 Claims, 10 Drawing Sheets

LED LIGHT HAS REMOVABLE SELF-POWER LED UNIT(S)

This application has subject matter in common with U.S. patent application Ser. Nos. 12/624,621, 12/622,100, 12/318,471, 12/318,470, 12/318,473, 12/292,153, 12/232,505, 12/232,035, 12/149,963, 12/149,964, 12/073,095, 12/073,889, 12/007,076, 12/003,691, 12/003,809, 11/806,711, 11/806,285, 11/806,284, 11/566,322, 11/527,628, 11,527,629, 11/498,874, 12/545,992, 12/806,711, 12/806,285, 12/806,284, 12/566,322, 12/527,628, 12/527,629, 12/527,631, 12/502,661, 11/498,881, 11/255,981, 11/184,771, 11/152,063, 11/094,215, 11/092,742, 11/092,741, 11/094,156. 11/094,155. 10/954,189, 10/902,123, 10/883,719, 10/883,747, 10/341,519, 12/545,992, 12/292,580, 12/710,918, 12/622,000, 12/710,561, 12/711,456, and 12/771,003.

The above-listed patent applications all relate, at least in part, to LED lighting systems for outdoor or indoor application, and that may be powered by alternating current (AC) or direct current (DC) power sources such as an electric cord and plug for an outlet, a battery, a transformer, a solar power source, or any other suitable power source to create, by applying optics theory, a plurality of LED light beams suitable for illuminating close or remote areas by projection. Also disclosed in the above-cited applications are LED lighting systems with more than one light source, more than one function, more than one optics means, more than one projection means, and lighting systems that provide super power and cost saving.

BACKGROUND OF THE INVENTION

The current invention is an LED light device which has one or more LED units that not only can work with the device power system but also have their own self-power construction so that they can be removed from the device and carried to illuminate a desired location where the device cannot be used.

The marketplace offers many different LED light devices for people to use at different locations with desired functions and light performance. Some LED lights work on 120 Volt AC power and some LED lights work on DC power. However, one of the existing LED light devices is able to employ more than one type of power source. In contrast, the current LED units can work with more than one power source, one of which is from a device system and one is self-powered. This allows the LED units to be removed from the device and carried anywhere for illumination, the LED units having their own switch or sensor means to enable the LED units be turned on and off to achieve a pre-determined function, brightness, color, timing, duty cycle, and/or duration. The LED units may also include circuit means with a power saving IC or cost saving circuit such as the ones disclosed in copending application Ser. Nos. 12/624,000 and 12/624,621 that have more than one power source or interchangeable power sources and cost saving designs, as well as contact means to supply an electric signal from the device system that enables the device system to cause the LED unit to turn on and off to achieve a pre-determined function, brightness, color, timing, duty cycle, or duration.

According to a preferred embodiment of the invention, the removable LED unit may include a charging circuit to allow recharging of an energy storage means to provide power to the LED unit for self-power operation, non-rechargeable batteries, or obtain energy from an adaptor, transformer, solar cells, wind power, generator, chemical power source etc. The LED unit power source, as well as the device system power source, may thus be selected from a 120 Volt AC source, a DC source, a transformer source, an adaptor source, a solar power related source, a wind power related source, a chemical related source, an energy storage means, or any other power source available from the marketplace. In addition, the device system may incorporate multiple functions, for example as a light fixture, power fail light, motion sensor, photo sensor, emergency light, or flash light to offer illumination under all kinds of conditions, such as during an earthquake, power failure, flood, fire, or any other incidents or unexpected hazards caused by people or the environment that require portable or emergency lighting.

In addition to the above improvements, the preferred system may include any of the following features:

A. The LED light device may use the more than one optics means described in U.S. patent application Ser. No. 11/806,284, in which LED elements are incorporated with optics media to cause the LEDs to provide an area light illumination effect to act as a night light.

B. The LED light device may also use the multiple light sources described in U.S. patent application Ser. No. 11/255,981, in which multiple LED elements are arranged in a matrix shape to face in one or multiple directions, and/or to have different positions, orientations, or locations to be seen by viewers, some of the LEDs serving as a night light and some as an emergency light.

C. The LED light device may also, as described in U.S. patent application Ser. No. 11/255,981, include first and second LED elements each having a plurality of LEDs that face in more than one direction, or that are at different locations, positions, or orientations, to illuminate multiple areas.

D. The LED light device may include one of mechanical or electric switches having at least one function selected from on, off, auto, timer, time delay, flashing, partial on, partial off, partial flashing, partial chasing, partial random, partial fade-in and fade-out, on/off blinking function duration, power saving selection, blinking function selection, persistence of vision effects, on/off percentage of each blinking cycle, power saving setting or selection, LED group reset selection, or any LED light functions for a plurality of LEDs that is available from the marketplace.

E. The LED light device may also, as disclosed in U.S. patent application Ser. No. 11/806,285, include LEDs of any type or LED specification with single color or multiple colors, the color and number of illuminated LEDs being changeable to provide different light functions under control of a switch or sensor means.

F. The LED light device may also, as disclosed in U.S. patent application Ser. No. 11/806,285, incorporate other functions selected from an outlet, air freshener, motion sensor, beacon light, warning light, chasing lights, flashlight, bug repelling device, mosquito repelling device, mouse repelling device, sonic pest repelling device, projection device, or persistence of vision device.

G. Still further, the LED light device may, as disclosed in U.S. patent application Ser. No. 11/255,981, include an LED or LEDs for indicating the battery status, including low battery capacity, full capacity, or half capacity, with preferred colors indicating the status of the batteries or the duty status of the batteries.

H. The LED light device may also use the special effects described in the patent application entitled "LED Device Has Special Effects" filed on Feb. 25, 2010, in which the LED is caused to flash faster than the human eye response time of $1/24$ to $1/16$ second to cause the illumination to appear to be steady due to the persistence of vision effect and let the people see a continuous light beam while reducing power consumption of the batteries.

I. The LED light device may, according to the above-described persistence of vision effect, have an on time of 1/48 second, achieved by flashing at a frequency of 48 Hz, or by having an appropriate on/off duty cycle percentage, selectable by a power saving setting or selection, or by an LED group reset selection.

J. In addition, the battery of the LED light device may be arranged to have a voltage higher than the LED trigger voltage, or a voltage that is lower than the LED trigger voltage with the voltage being increased by an electric circuit that raises or boosts the battery voltage up to the LED trigger voltage.

K. For example, a preferred LED light device with power saving features may include:
at least one LED to provide a light source;
at least one housing having space to install any of the following: circuit means, conductive means, electric components parts and accessories, switch means, sensor means, an integrated circuit (IC), and a micro controller to connect with a power source to cause the LED to turn on and off to achieve a predetermined function, effects, on/off duration, duty cycle, color, and/or brightness; and with power saving features being achieved by using control means to control the LED's turn-on and turn-off duration time for a certain percentage of each cycle, at a rate that takes advantage of the persistence of vision effect of the human eye, which has a response time of within 1/24 to 1/16 second.

L. An LED light device of the type described in part K may also include cost saving features achieved by using batteries which have a total voltage that is less than the LED's trigger voltage and voltage increasing electric components, parts, and accessories to raise the batteries' voltage to over the LED or LEDs trigger voltage.

M: Finally, the LED light device may include an interchangeable power source which can switch from a 120 Volt AC power source to a battery power source as described in U.S. patent application Ser. Nos. 12/232,505, 12/292,153, 12/318,473, 12/318,470. 12/318,471 and 12/622,000.

BRIEF DESCRIPTION OF THE DRAWINGS

FIG. 2 is an enlarged view of the portion of the LED light of FIG. 1, showing one of the LED units having a finger groove to enable easy removal of the LED unit(s) from the LED light.

FIG. 3 is an exploded isometric view of the LED light device of the first preferred embodiment.

FIGS. 4, 4-1, and 4-2 show a simple LED unit that may be used in the light device of the first preferred embodiment.

DETAILED DESCRIPTION OF THE PREFERRED EMBODIMENTS

The current invention may be applied to any kind of LED light device, by including the LED light device a plurality of LED unit(s) to having a predetermined light performance to provide regular illumination and/or any of the follow types of lights: power fail light, motion sensor light, spotlight, garden light, emergency light, floor light, flash light, desk lamp, table lamp or any other known type of LED light. The LED unit(s) each has its own power source to enable illumination after the LED unit(s) has been removed from the LED light device. Hence, invention offers a very practical additional function to the consumer and makes the LED light device become a more valuable device.

The LED light device and LED Unit(s) may incorporate a same power source or different power sources depending on market requirements. The LED light device has compartment (s) and means to allow the LED unit(s) to fit solidly within the compartments. Furthermore, the current invention includes safety considerations that ensure that people will not touch any electricity carrying parts of the LED light device while the LED unit(s) is removed from the compartment(s). Any electricity carrying parts of the compartment will meet safety regulations and protect people from electric shock.

The current invention differs from the arrangements described in copending applications directed to LED lights with interchangeable power sources, which can switch from a 120 Volt power source to a battery power source, as described in U.S. patent application Ser. Nos. 12/232,505, 12/292,153, 12/318,473, 12/318,470, 12/318,471 and 12/622,000. The current invention is not directed to interchangeability from one power source to another source, but rather to interchangeability of LED unit(s) from an external power source of an LED light device to its own internal power source which has similar electric signals to trigger the LED unit(s) LED to perform desired function(s). In particular, the LED unit(s) has its power source but when fitted into the LED light device, it uses the LED light device's electric power system and not its own power system.

Figure 1:
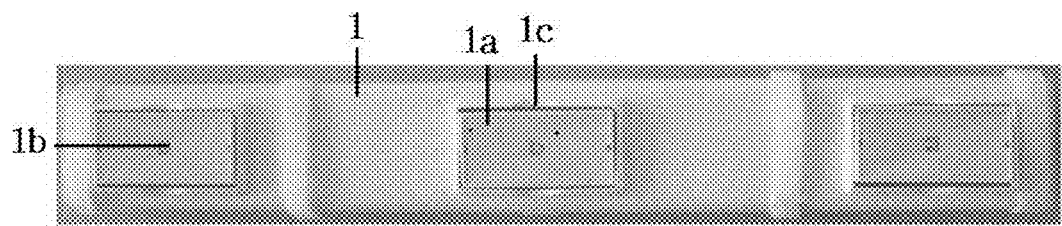
FIGS. 1, 3-1, and 3-2 are front views showing a first preferred embodiment of the current invention, in the form of an LED light having three removable LED units.

FIG. 1 shows an LED light device (1) which may obtain power from indoor electricity such as the 120 Volt 60 Hz AC line power used in North America. It also can use battery power, or obtain power from an adaptor, transformer, or USB power system. The LED light has (3) LED units (1b) and the LED unit(s) (1a) can be easily removed from the LED light device with the aid of a finger groove (1c).

Figure 2:
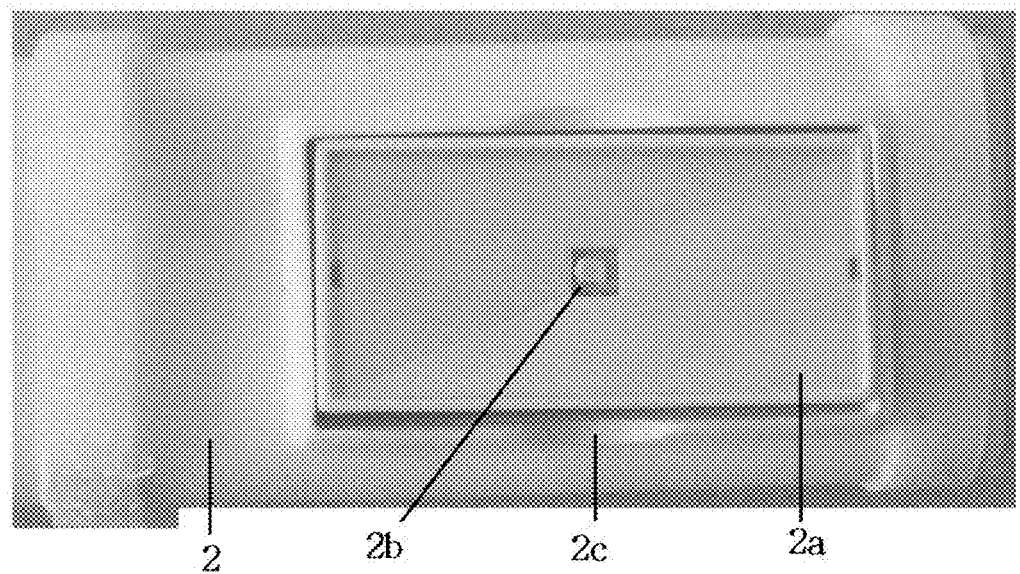

FIG. 2 shows an LED light (2) having an LED unit (2a) with surface mounted LEDs (2b) on the LED units. The LED unit (2a) can easily be removed with the aid of finger groove (2c) at any time.

Figure 3:
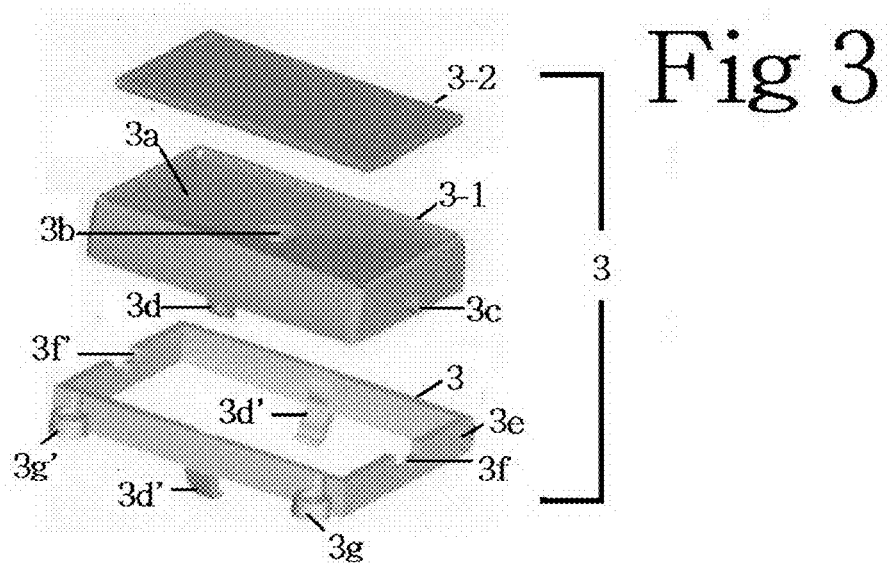
Figures 1, 3:
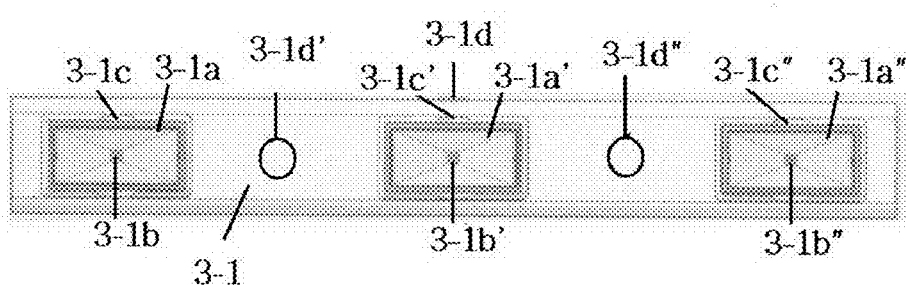
Figures 2, 3:
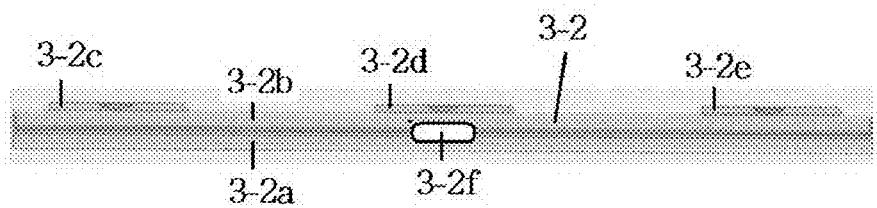

FIG. 3 illustrates the construction of an LED unit (3) having a frame (3') to hold the LED unit housing (3-1). The frame (3') has two cut-out areas (3f) (3f') to hold two extend-bars(3c) (3c' not shown) to enable the LED unit(s) to tilt in both directions. The LED (3b) is located at the center of the optics surface (3a) so that the LED (3b) light beam provides optimal illumination. The cover (3-2) covers the optics surface (3a) and LED (3b) to prevent people from touching electricity carrying parts. The frame (3') has two fixing-means (3d) (3d') to fit the frame into the LED light device's compartment (not shown in this figure) so that the LED unit(s) will fit well on the LED light and pass all related safety requirements.

As shown in FIGS. 3-1, the LED light device (3-1) has 3 LED units (3-1a) (3-1a') (3-1a") each including at least one LED (3-1b) (3-1b') (3-1b") arranged on an optical surface to widen the narrow LED light beam. Each location of the LED units has a finger groove (3-1c) (3-1c') (3-1c") to allow people to easily remove the LED unit and assemble it back in the light device. A motion sensor (3-1d) or photo sensor (3-1d') can be installed at any desired location, and/or any mechanical or electric switch means or sensor means can be included to turn on or off the ED or LEDs according to a predetermined timing, duration, and/or function. For example, in the light device of FIGS. 3-2 the motion sensor (3-1d) or photo sensor (3-1d') of FIGS. 3-1 are replaced by a push on-push off switch (3-2f). One can also substitute a remote controller receiver to control the LED light. As a result, any mechanical or electric switch means or sensor means for causing the LED light to illuminate will still fall within the scope of the current invention.

Figures 1, 4:
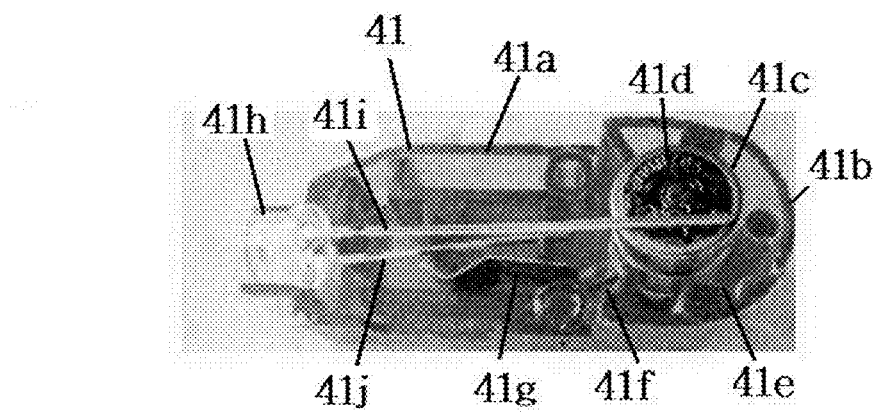
Figures 2, 4:
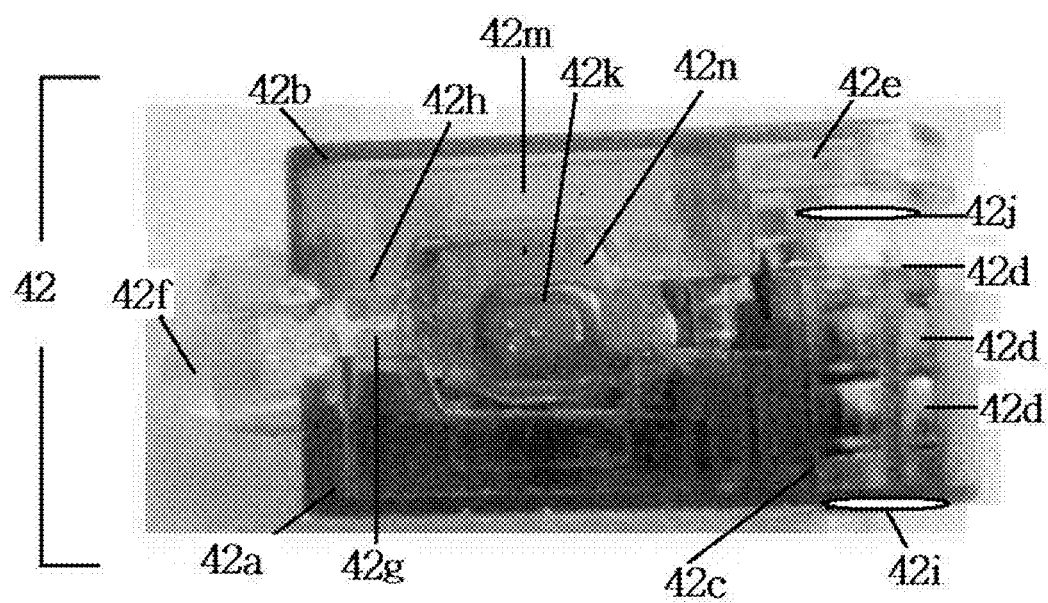
Figure 4:
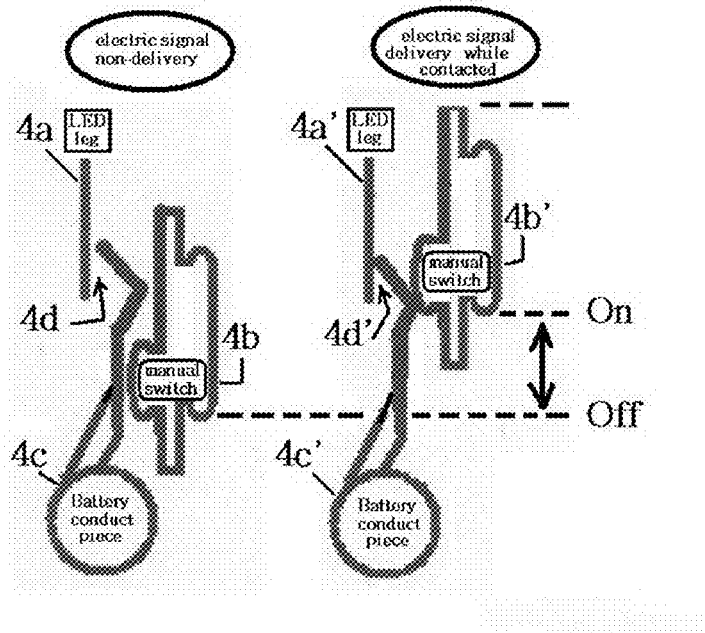

FIGS. 4-1 shows a commercially available LED unit that may be arranged to be used as one of the removable LED units and that has a very simple construction. In this LED unit, one LED (41h) has 2 terminals (41i) (41j). The terminal (41i) directly contacts a positive terminal of a battery assembly (41c) and the other terminal (41j) contacts with the battery assembly though a contact-means (41g). The contact means (41g) has "reverse u" raised-parts which are pushed by a plastic switch (42k) to cause the contact-means to contact the LED terminal (41j) to the negative terminal of the battery assembly to deliver electricity and turn the LED on. Reversing the direction of the plastic switch (42k) will turn the LED off. This is a very simple construction of a simple LED unit. To add more functions, one can add any of a motion sensor, power fail detector, push on-push off switch or mechanical or electric switch, sensor means, switch means, circuit means, IC means, variable switch means, or other switches or detectors to cause the LED(s) to provide a desired performance.

FIGS. 4-2 shows the same LED unit as FIGS. 4-1 but with side view details.

FIG. 4 shows the manner in which plastic switch (42k) shown in FIGS. 4-1 and 4-2 moves into position to push the contact-means (41g) and make contact with LED terminal (41j).

Figure 5:
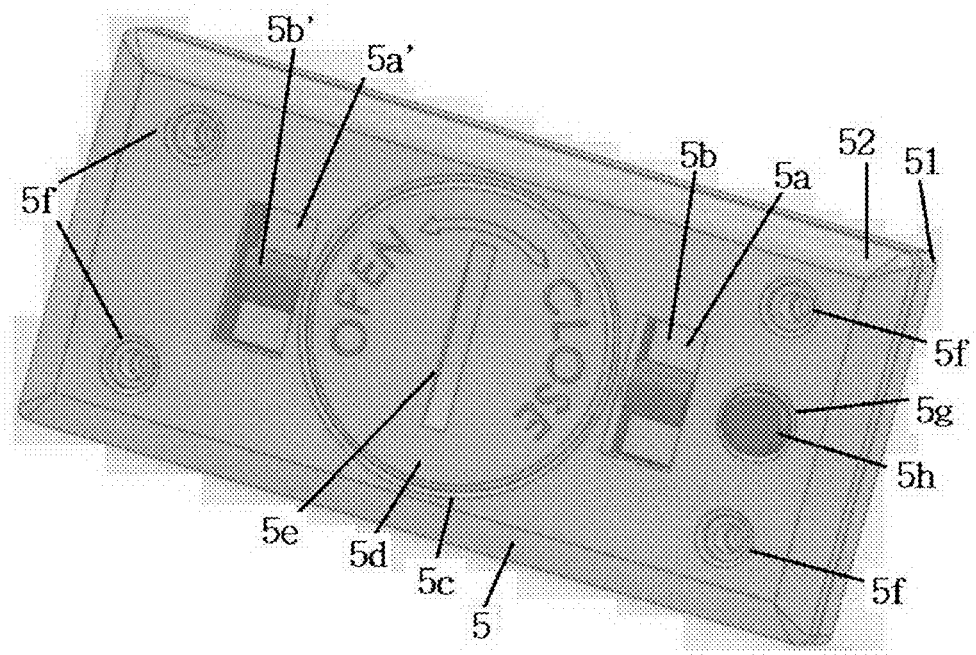
FIG. 5 is a schematic diagram of a contact design for an LED unit to connect the LED unit with the LED light device.

FIG. 5 shows a preferred LED unit design for the LED light device of the first preferred embodiment, which is alternative to the LED unit of FIGS. 4-1 and 4-2, The LED unit has a housing (5) which includes space (5a) (5a') to arrange electric signal delivery-means (5b) (5b') to allow the LED unit to be incorporated with the LED light electric system to terminate electricity deliver to the LED unit when it is removed and powered by its own power source. While the LED unit is removed from the LED light, the LED unit will only use its own electric system which is not powered from the LED light. The delivery-means not only delivers electricity but also cuts out the other electric system, and can have all kinds of alternative design or functions, which will still fall within the scope of the current invention.

The fixing-means allows the LED unit to be securely assembled to and disassembled from the LED light. Hence, both the LED unit and LED light device are designed to allow the fixing-means to be arranged for this purpose. the fixing means can be a snap fit arrangement, a catch, a hook and loop fastener, a magnetic coupling, press-fit arrangement or any other suitable fixing means.

Figure 6:
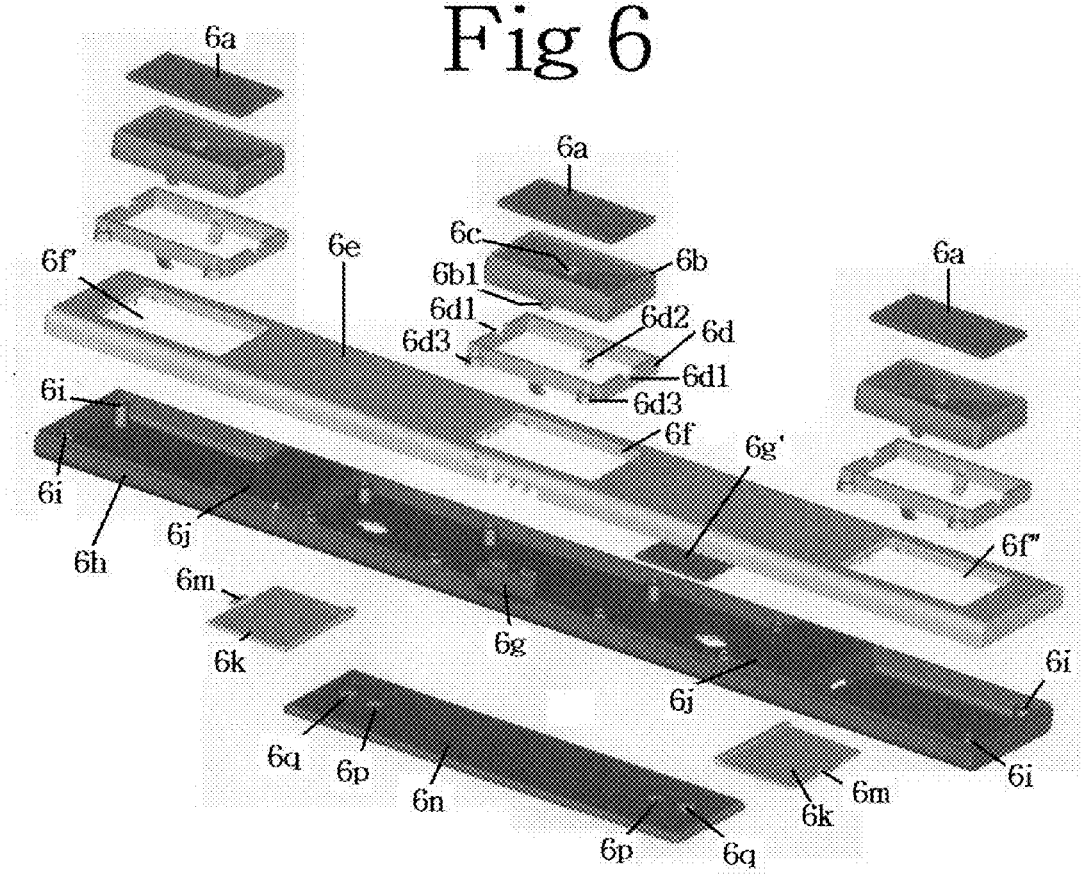
FIGS. 6, 7, and 11 are exploded perspective views of an application of the LED light device of the first preferred embodiment as an under-cabinet LED light which has a plurality of removable LED units and compartments to fit the LED units.
Figure 7:
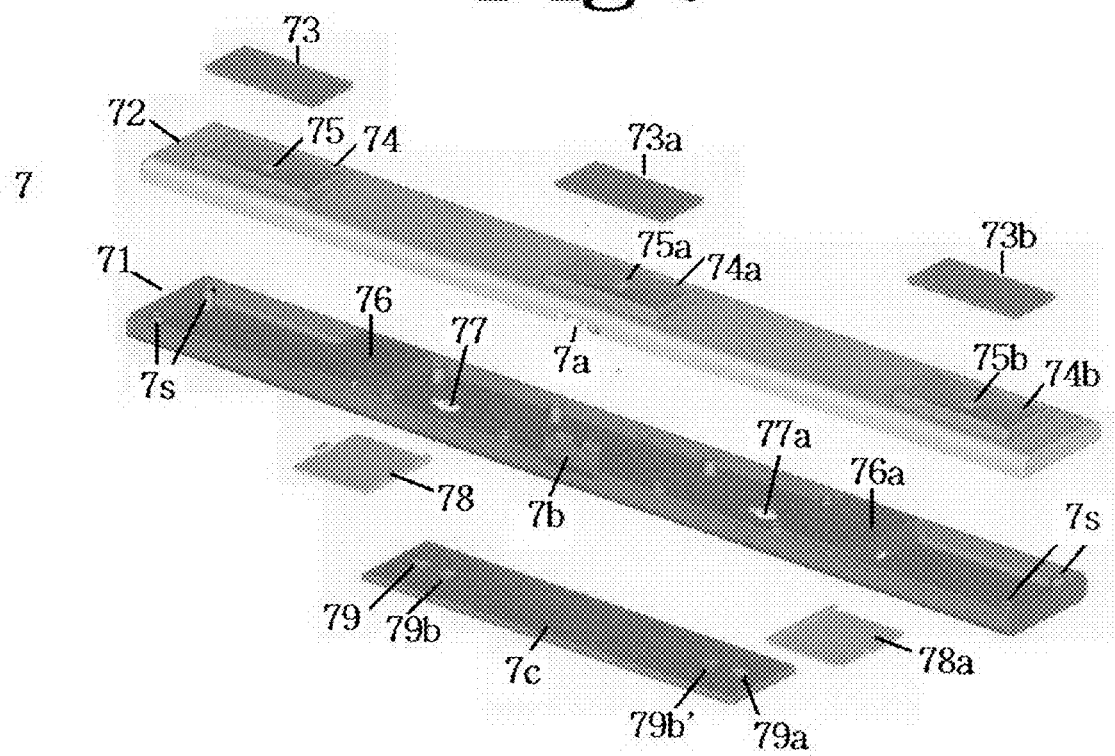
Figure 8:
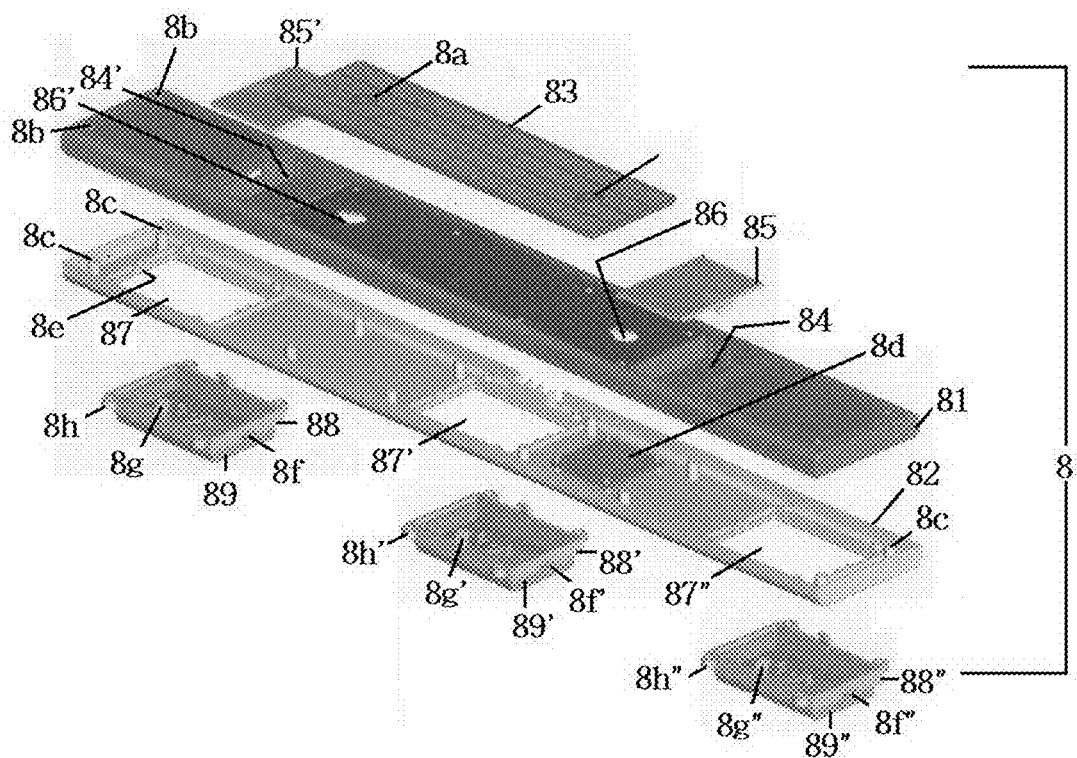
FIG. 8 is an exploded isometric view of the under-cabinet light device of FIGS. 6 and 7, taken from the rear.

FIGS. 6, 7, and 8 show other preferred embodiments of an LED light device having plurality of LED Units that can be removed from and assembled back to the LED light device.

As shown in FIG. 6, the LED light (6e) may have all kinds of predesigned functions to enable the plurality of LED units to offer illumination to certain areas with at least one function or serve as, for example, a regular illumination light, desk top light, floor light, garden light, emergency light, reading light, night light, light fixture, motion sensor light, power fail light, photo sensing light, dimmable light, spotlight, car light, vehicle light, boat light, aircraft light, or general purpose LED light. The LED light can be any kind of light which has an LED (6c) as light source. The LED (6c) is arranged on an optic-surface (6b), and a lens (6a) is assembled to the LED unit. The LED unit is assembled to the frame (6d) using assembly-means. The Frame has fixing means (6d2) to cause the LED units to fit within the LED light.

FIG. 7 shows LED units (74) (74a) (74b) that are removable from the LED light device (72) and have their own self-power source to cause the LED unit(s) to turn on and turn off to achieve a predetermined function, brightness, color, timing, duty cycle, and/or duration.

The LED units include electrical signal delivery-means (not shown) to allow the LED units to be connected with the LED light device's electrical system when the LED units are put back into the LED light and to disconnect the LED units power source according to a preferred circuit arrangement. The LED units therefore can utilize more than one power source, including the power source of the LED light device and the power source of the LED units, which include appropriate electrical circuitry, conductive elements, wires, and/or metal pieces to enable the LED units to use their own power source and circuitry while removed from the LED light device, and to use the power source and electrical circuitry of the LED light device when the LED units are assembled back to the LED light device. Hence, the LED units will operate using more than one power circuit.

The power source for the LED light device ad/or LED units may include a 120 Volt AC power source, batteries, adaptors, a USB power source, a transformer, a generator, a solar cell, wind power, or chemical power source and related circuitry. For example, the LED units can take the form of an LED night light having two prongs to that enable the removed LED unit to be plugged into a 120 Volt home electric outlet to provide its own illumination. the LED Units are inserted back into the LED light device, it will operate in response under control of the LED light device's own control elements, such as a remote controller, motion sensor, PIR sensor, Blue Tooth Sensor, or any other electric system that can be used to control LED lighting functions.

The LED light or LED units incorporate electric parts and accessories that may include a power saving IC, cost saving circuit, integrated circuit (IC), sensor, switch, contact means, conductive means, other electric components, blue tooth sets, modules, or any other circuit available from the marketplace to cause the LED or LED units to have a predetermined performance. In addition, the LED units' self-power source may be rechargeable or non-rechargeable when connected with the said LED light device, and the function and/or performance of the LED units may be the same or different from that of the said LED light device, which in turn may include any kind of conventional LED light device functions available from the marketplace.

The LED units of the preferred embodiments thus allow people to remove the LED units from the LED light and carry them anywhere to illuminate desired areas while the LED light device is still in its original installation position. As a result, the LED light device's compartment(s) should include electric contact-means that prevent people to touch electric-carry parts while the said LED units are removed from the said compartment so this will not have electric-shock hazard.

The LED units shown in FIG. 7 also have fitting-means to enable the LED units to fit into the LED light device to pass safety requirements.

Figure 9:
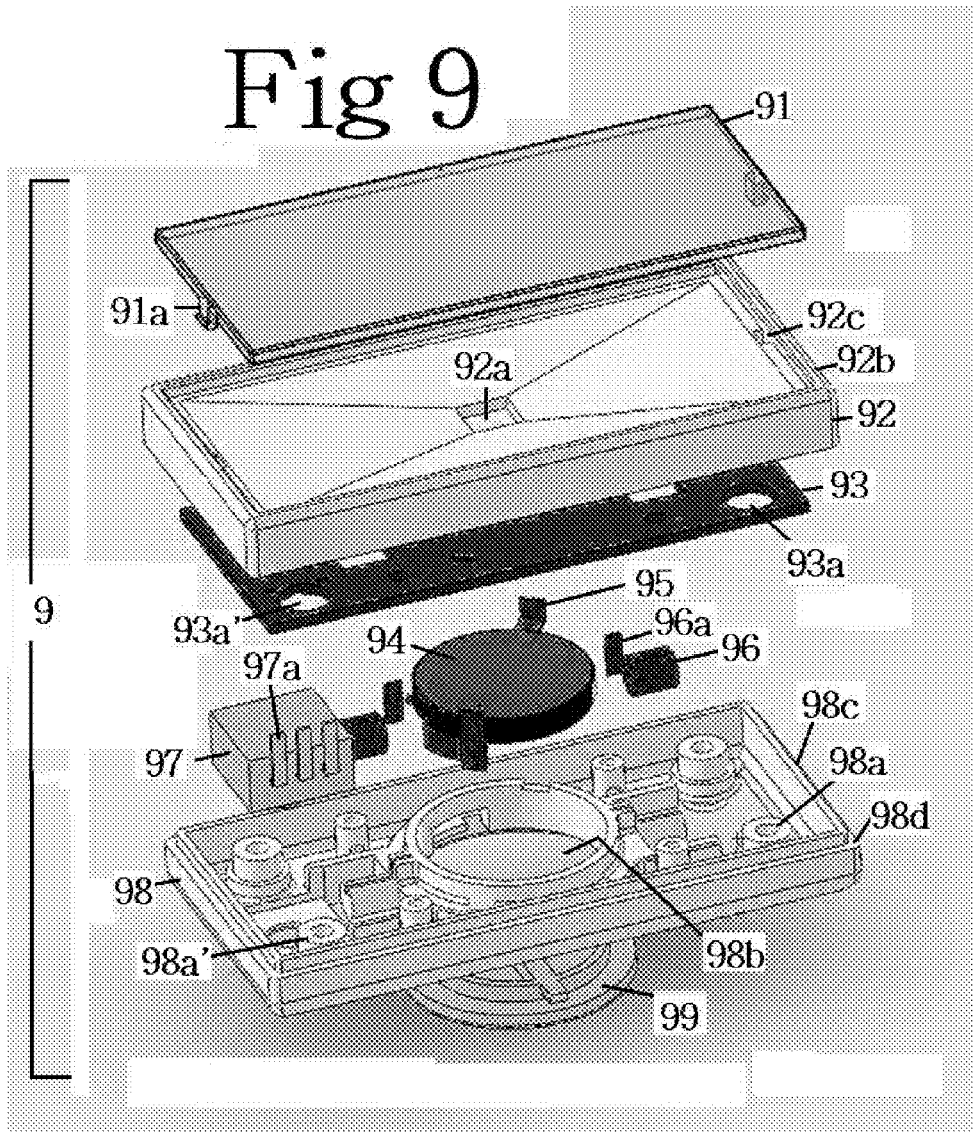
FIGS. 9 and 10 are exploded perspective views of an LED units suitable for use in the under-cabinet light device of FIGS. 6-7.
Figure 10:
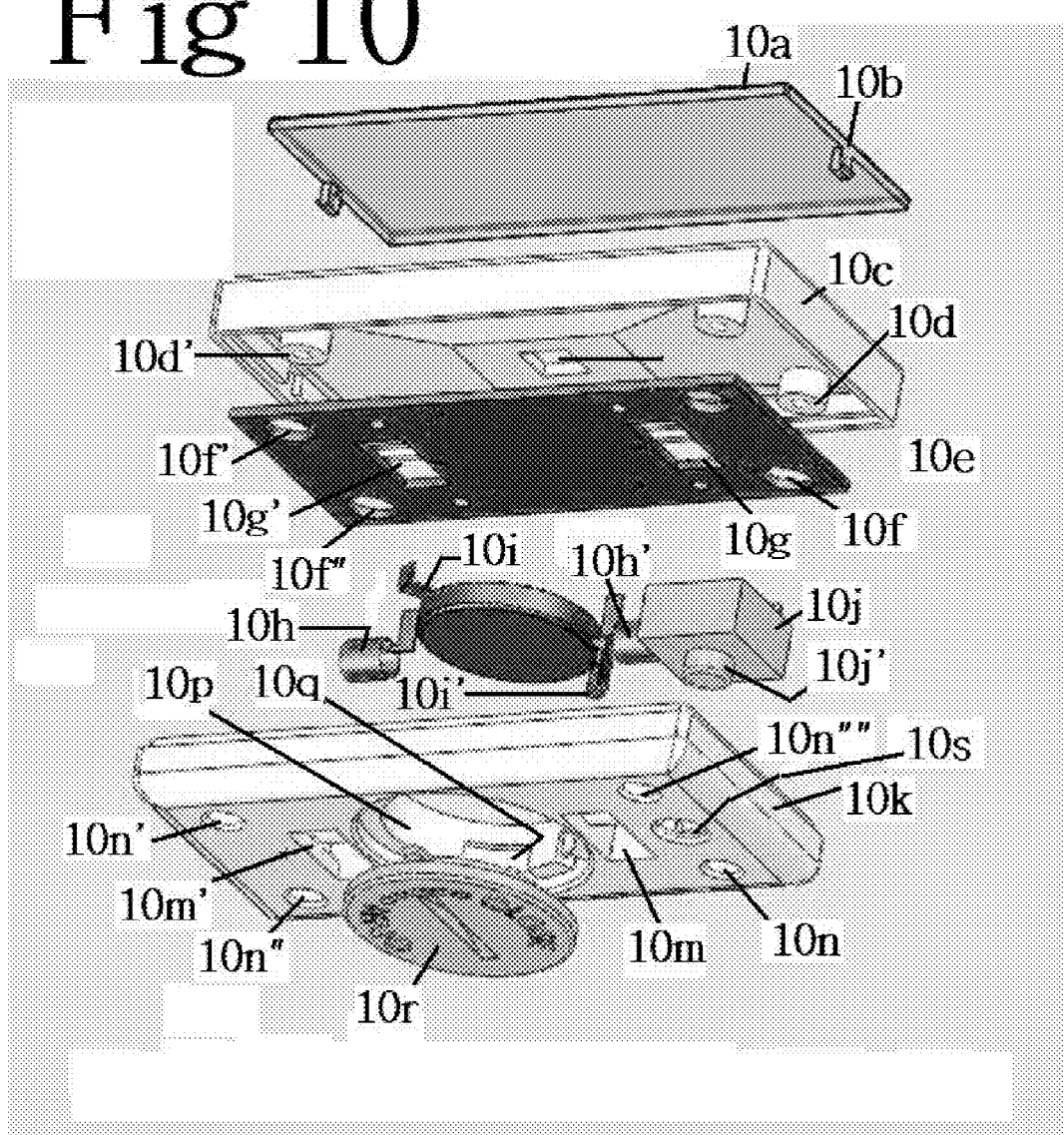
Figure 11:
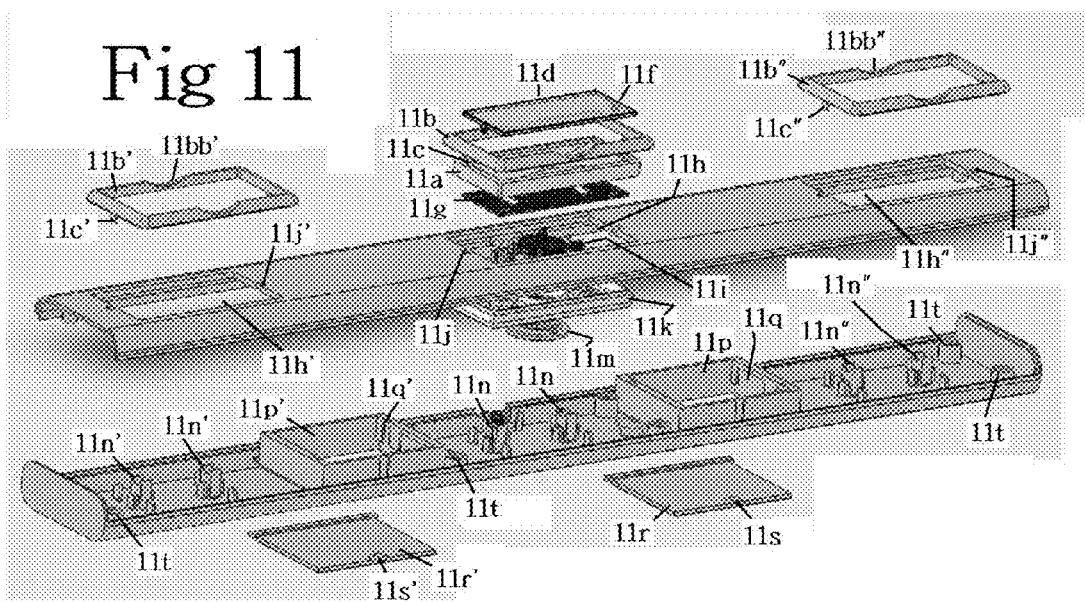

FIGS. 9 and 10 of a preferred LED unit having a housing (98) containing a circuit (97) with IC chip terminals (97) for extra functions. The IC chip terminals are connected with a PCB (93) and at least one LED arranged in a hole (92a) of an optics-surface and the optics-surface (92b) is installed on a frame (92) to enable the cover (91) and optics-surface (92b) to be tilted along extend-bars (not shown) and opening (92C). The power source for this embodiment is a battery (94), which may be a lithium 2032 battery, or any other energy storage component(s). The PCB and circuit are designed to facilitate a power source change between the LED light device and the LED units. Hence, the LED units can use different or same electric signals from the LED unit's own power source or from the LED light device's power source while the LED units are respectively removed from LED light device or assembled back to the LED light.

As described above, the LED units and LED light device both have predesigned circuits and electric-signal arrangements, but the LED units can utilize both circuits and electric-signals to enable the LED units to be powered by their own circuit and electric-signal when removed from the LED light and to be powered by the LED light device's circuit and electric-signal when the LED units are assembled back to the LED light device. This will enable one LED light having a lot of LED units to have a lot of other functions. For example, LED light device may have three LED units all with different functions, which may include by way of example and not limitation any of the following: a first function as a wall outlet night light, a second function as a battery operated night light, a third function as LED units as a traditional lamp socket, a fourth function as an emergency light with super long lasting battery life time using a power save IC chip, a fifth function as a blue-tooth module to communicate with other blue tooth devices, a sixth function involving remote control features, a seventh function involving a PIR sensor, an eighth function as a motion sensor light, and a ninth function as a garden light powered by a solar module. However, when all of these plurality of LED units are assembled back to the LED light device, all LED units will have the same function as the LED light device. This can save people having to spend a lot of money for a multiple purpose LED light device.

The invention claimed is:

1. An LED light device having at least one removable self-powered LED unit, wherein the LED light device has a geometric shape and construction that enables the LED light device to provide illumination to a predetermined area when the LED unit is assembled and connected to the LED light device, said LED light device serving as one of the following types of light: regular illumination light, desk top light, floor light, garden light, emergency light, reading light, night light, light fixture, motion sensor light, power fail light, photo sensing light, dimmable light, spotlight, car light, vehicle light, boat light, aircraft light, and multi-purpose light, wherein the LED unit is removable from said LED light device and has its own power source and circuitry to cause at least one LED in the LED unit to turn on and off with a predetermined brightness, color, timing, duration, and/or duty cycle when the LED unit is removed from the LED light device, wherein the LED light device includes electricity delivery means for supplying electricity from a power source of the LED light device to the LED unit when the LED unit is assembled and connected to the LED light device, said electricity delivery means being further arranged to disconnect the power source of the LED light device when the LED unit is removed from the LED light device, wherein the power source of the LED light device and the power source of the LED unit are selected from the group consisting of: a 120 Volt AC power outlet connection, at least one battery, an adaptor, a USB power source, a transformer, a generator, a solar cell, a wind power source, and a chemical power source, wherein the circuitry of the LED unit includes at least one of the following circuit components: a power saving IC, an IC, a cost saving control circuit, a sensor, a switch, contacts, and conductors, wherein the LED light device includes a plurality of compartments for receiving said LED light unit, said plurality of compartments each including one said electricity delivery means for supplying electricity to the LED unit and for disconnecting the power source when the LED unit is removed to thereby prevent electric shock to user's of the LED light device, and wherein said LED unit include a fitting means to removably secure said LED unit within one of said compartments.

2. An LED light device as claimed in claim 1, wherein said power source of said LED light device, which supplies electricity to said LED unit when the LED unit is connected to the LED light device, is different from the power source of the LED unit, which supplies power to the LED unit when the LED unit is removed from the LED light device.

3. An LED light device as claimed in claim 1, wherein said LED light device is powered by an indoor or outdoor electrical system.

4. An LED light device as claimed in claim 1, wherein the power source of the LED unit includes batteries, a capacitor, and/or other energy storage components.

5. An LED light device as claimed in claim 1, wherein said power source of said LED unit includes external connecting means for connecting the LED unit to an indoor or outdoor external power source, said external connecting means including at least one of the following components: prongs, an adaptor, wires, and conductors.

6. An LED light device as claimed in claim 1, wherein when said LED unit is assembled and connected to LED light device, said LED unit uses power supplied by the LED light device and does not use power supplied by the power source of the LED unit.

7. An LED light device as claimed in claim 1, wherein said fixing means is selected from the group consisting of a snap fit arrangement, a catch, a hook and loop fastener, a magnetic securing arrangement, and a press fit arrangement.

8. An LED light device as claimed in claim 1, wherein said at least one LED unit includes a plurality of LED units, at least two of which have different circuitry to provide different functions when removed from said LED light device.

* * * * *